United States Patent [19]
Yasutomi et al.

[11] Patent Number: 5,001,635
[45] Date of Patent: Mar. 19, 1991

[54] VEHICLE

[75] Inventors: Fumio Yasutomi, Hirakawa; Daizo Takaoka, Takatsuki; Naoto Tojo, Ikoma; Yoshiya Yamaue, Nara; Makoto Yamada, Katano; Kazuyoshi Tsukamoto, Osaka, all of Japan

[73] Assignee: Sanyo Electric Co., Ltd., Osaka, Japan

[21] Appl. No.: 290,159

[22] Filed: Dec. 27, 1988

[30] Foreign Application Priority Data

Jan. 8, 1988 [JP] Japan ..................... 63-2740

[51] Int. Cl.$^5$ ..................... G06F 15/50; G05B 19/42
[52] U.S. Cl. ..................... 364/424.02; 364/449; 364/513
[58] Field of Search ............ 364/424.02, 443, 449, 364/513

[56] References Cited

U.S. PATENT DOCUMENTS

| | | | |
|---|---|---|---|
| 4,119,900 | 10/1978 | Kremnitz | 364/424.02 |
| 4,556,940 | 12/1985 | Katoo et al. | 364/424.02 |
| 4,628,454 | 12/1986 | Ito | 364/424.02 |
| 4,674,048 | 6/1987 | Okumura | 364/424.02 |
| 4,782,447 | 11/1988 | Ueno et al. | 364/449 |
| 4,817,000 | 3/1989 | Eberhardt | 364/424.02 |

OTHER PUBLICATIONS

English Translation of "Sensor Technology", vol. 4, No. 4, 1984, Sensors in Floor Cleaning Robot.

Primary Examiner—Felix D. Gruber
Attorney, Agent, or Firm—Darby & Darby

[57] ABSTRACT

A vehicle which is capable of recognizing shapes in a predetermined area, comprising: a plurality of ultrasonic sensors, an encoder, map drawing means for sequentially and continuously drawing a map of the prescribed area determined by information received from the encoder and ultrasonic sensors, memory means for storing the map drawn by the map drawing means and control means for instructing rectilinear movement, starting stopping and turning of the vehicle so as to move in a serpentine fashion, wherein the ultrasonic sensors, encoder and map drawing means are operated by the control means, the memory means writes and stores a history of its own movements in the area and as information is received remembers detected information from the encoder, and a change of direction of the vehicle which is instructed by the control means is determined by information on the map as well as the areas through which the vehicle has previously passed.

13 Claims, 14 Drawing Sheets

VEHICLE

BACKGROUND OF THE INVENTION (1) Field of the Invention

The present invention relates to a vehicle which, in a prescribed area, is able to recognize and discriminate shapes in that area, and as an example of its application, can be used, as a robot for cleaning a room automatically.

(2) Description of the Prior Art

Conventionally, a vehicle such as a floor cleaning robot, operates by moving forward and backward repeatedly, travelling around a room, detecting and recognizing shapes and obstacles in the room is shown, for example, in "Sensor Technology", April 1984, on pages 52–56.

When electric power is applied by means of an AC source through an electric cord during cleaning operation, there is the problem that the action of circling the room, recognizing obstacles, is often time consuming or sometimes recognition of particular objects is impossible, or ornaments in the room are pulled down by the cord which tends to twist round the obstacles.

SUMMARY OF THE INVENTION

The present invention has been devised to solve the problems encountered in the prior art as mentioned above.

The object of the present invention therefore, is to provide a vehicle which moves in a predetermined area and recognizes shapes in that area.

The present invention comprises;
(i) distance measuring means to measure the distance from the vehicle to obstacles in a prescribed area,
(ii) position detecting means for detecting its own position in the prescribed area,
(iii) map drawing means for sequentially and continuously drawing a map of the prescribed area which corresponds to information received by the position detecting means and distance measuring means,
(iv) memory means for storing the map drawn by the map drawing means, and
(v) control means for controlling and instructing rectinlinear movement of the vehicle, including the actions of starting, stopping, and turning (changing direction).

The vehicle moves in a serpentine fashion, wherein the distance measuring means, the position detecting means and the map drawing means operate concurrently and simultaneously with every rectilinear movement of the vehicle. The memory means stores the vehicle position according to information received by the position detecting means. A change of direction is effected by the control means based on the position location and obstacle location recorded as (real time & historical) information on maps stored in the vehicle's memory.

That is, in the present invention, one of the features of the principal configuration is that, movement of the vehicle is in a serpentine fashion and at every rectilinear movement, the map drawing means is operated. The map can be drawn simultaneously with the serpentine movement. In effect, according to the present invention, since the map can be drawn simultaneoulsy with each serpentine movement, without necessarily circling the prescribed area, even in the case of a vehicle using a power cord, it is seldom that the cord is caught by the obstacle or pulls down objects placed in the prescribed area. furthermore, according to the present invention, it is advantageous that the vehicle can start moving not only from the periphery in the prescribed area but also from all locations in the prescribed area.

Examples in which the vehicle, according to the present invention, is applicable are as follows, (a) a robot for cleaning a room, roof, veranda and so on, and (b) a robot for inspecting the quality of painting and to detect damaged conditions on the floors of a room and other specially partitioned areas.

DETAILED DESCRIPTION OF PREFERRED EMBODIMENTS

Figure 1:
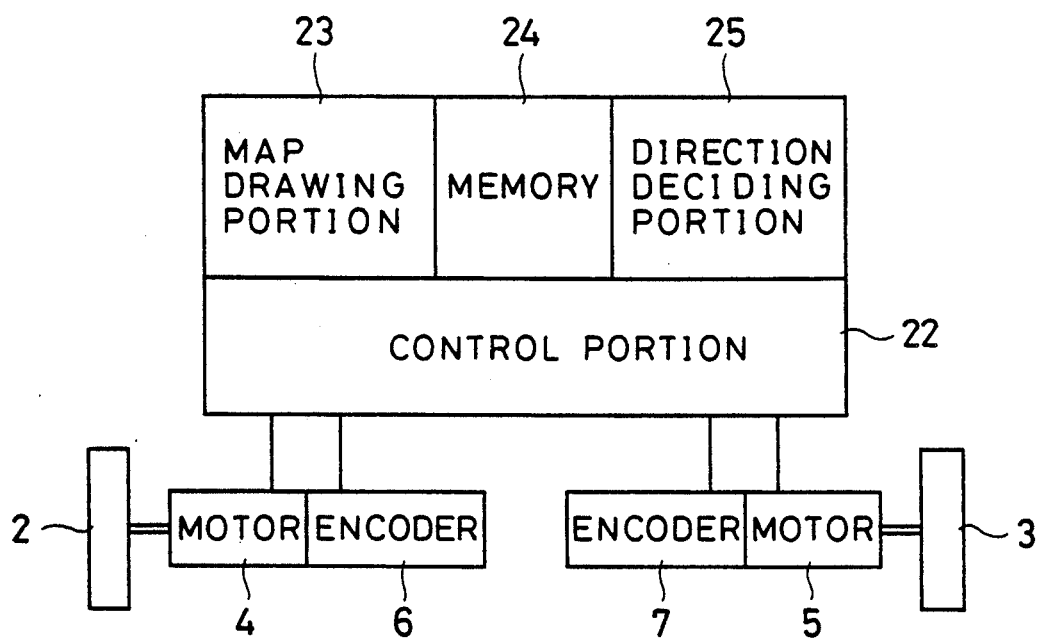
FIGS. 1 and 1A show a block diagram showing one embodiment of a vehicle of the present invention.
Figure 2:
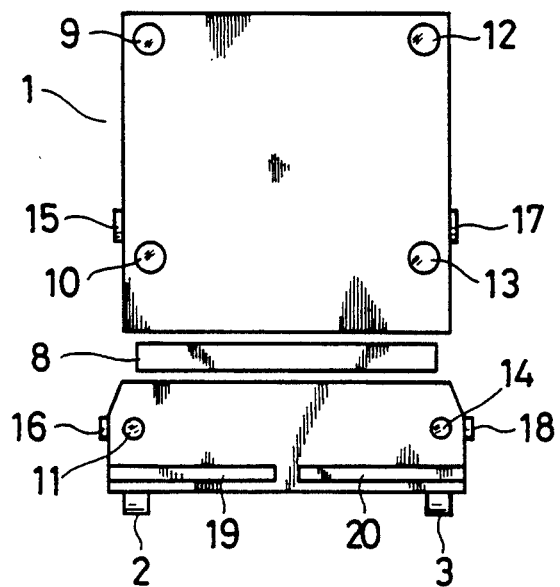
FIGS. 2 and 3 are respectively, a front view and a side view of one embodiment of a vehicle of the present invention.
Figure 3:
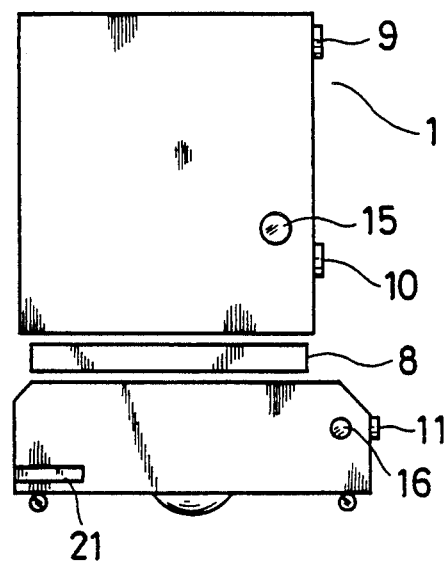
Figure 1A:
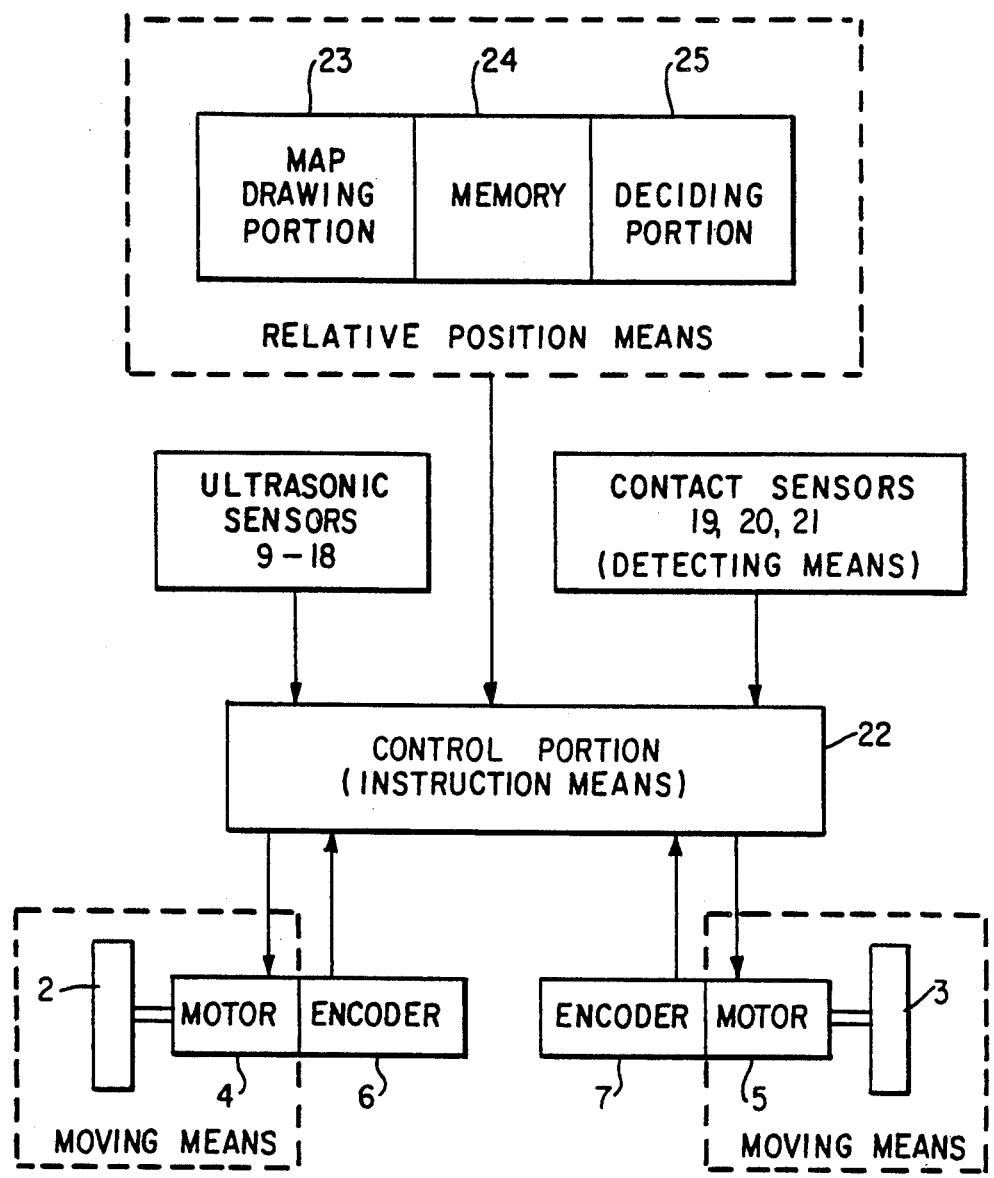

FIGS. 1 and 1A show a block diagram of one embodiment of a vehicle of the present invention, FIG. 2 is a front view of one embodiment of a vehicle of the present invention and FIG. 3 is a side view thereof. In these figures, numeral (1) denotes a car body of the vehicle, (2) (3) indicate driving wheels driven respectively by motors (4) (5) to move the car body (1) responsive to the degree of rotation. The degree of rotation (number of revolutions and direction of rotation) of the driving wheels (2) (3) are detected respectively by encoders (6)(7). Numeral (8) denotes a cord reel provided on the car body (1) onto which a power cord is wound for supplying power for driving the vehicle from the side wall and the like of a room. When a tension greater than a predetermined amount is applied to the power cord, the cord reel (8) automatically unwinds letting out more cord, and winds it back when the power cord is loosened below a predetermined tension. Such a power cord reel is usually connected to the wall surface of the room before operation of the vehicle. Numerals (9)(10)(11)(12)(13)(14) are ultrasonic sensors installed at front portions of the car body (1), and (15)(16)(17)(18) are ultrasonic sensors disposed at the side panels of the car body (1), which detect obstacles at the front and on the sides, respectively as well as the distance the object is from the vehicle. Numerals (19) (20) indicate contact sensors installed on the front surface of the car body (1), and (21) denotes a contact sensor provided on the rear surface, which respectively, detect obstacles by physical contact and may be considered detecting means. Numeral (22) is a main control component portion which receives signals from the ultrasonic sensors (9) (10) (11) (12) (13) (14) (15) (16) (17) (18) and the contact sensors (19)(20)(21) for controlling rotation of the motors (4)(5) to adjust the amount of movement, and at the same time, includes a function component to detect the vehicles position according to the movement of the vehicle body by the signal from the encoders (6)(7) to recognize its present position. Numeral (23) denotes a map drawing component which recognizes shapes in a room and arrangements of obstacles in a sequential manner, corresponding to position information calculated by the main control component or instruction means (22) and distance information to the obstacles by the ultrasonic sensors. Numeral (24) indicates a memory for storing the map thus drawn, as well as the movement of the vehicle body in the room (1) sequentially by position information from the main control component (22). Numeral (25) is a component for deciding and determining direction of the vehicle body (1) from such map information and information about the movement of the vehicle and based on this information makes decisions for which, the main control component (22) controls the motors (4) (5) to give the desired movement to the moving vehicle. Collectively, portions 23, 23 and memory 24 may be considered a relative position means. It is assumed that the vehicle includes a floor cleaning function and sucks up dirt and dust from the floor.

Figure 4:
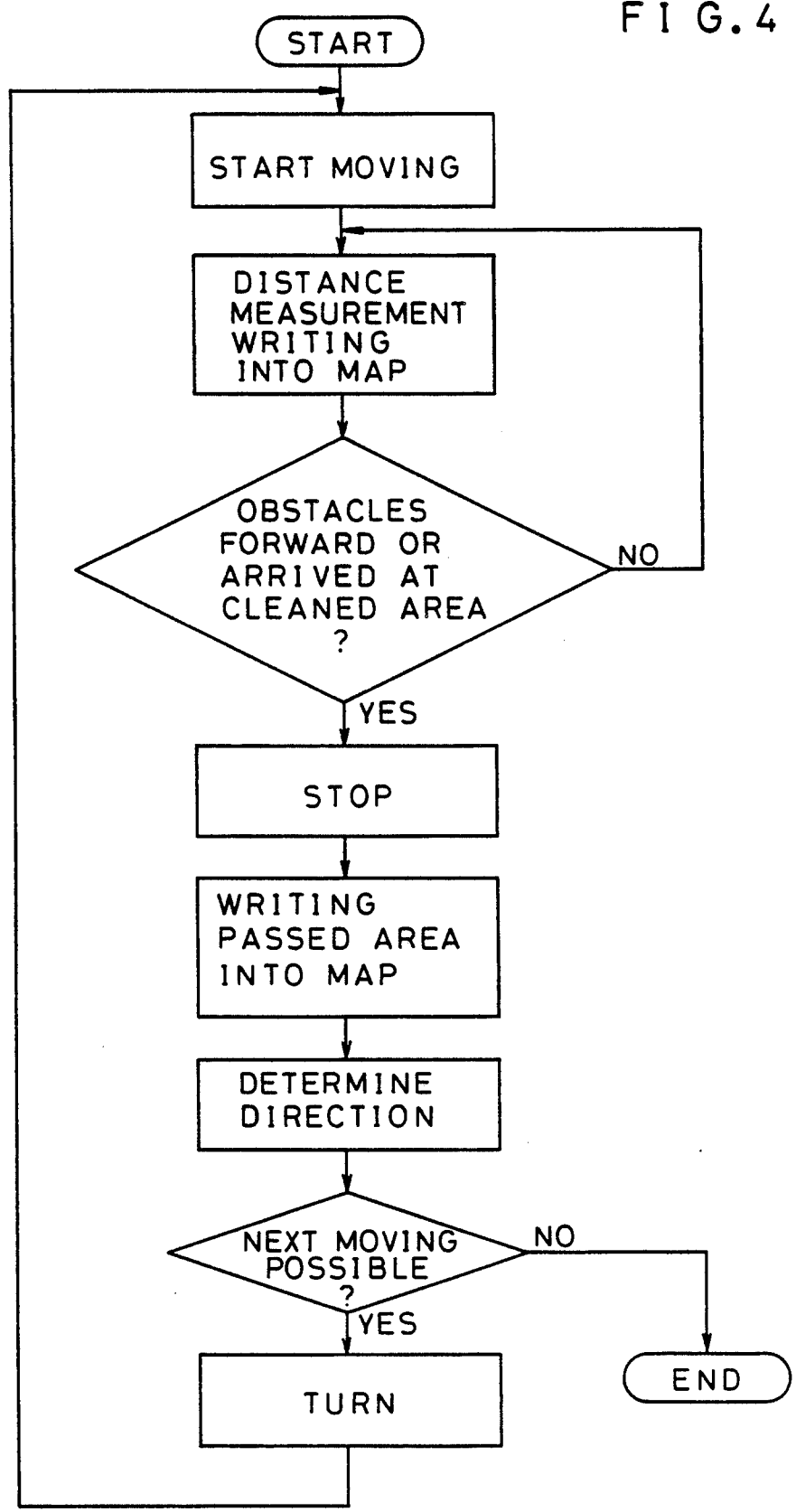
FIG. 4 is a flow chart for explaining schematic operation of one embodiment of a vehicle of the present invention.

FIG. 4 is a flow chart showing operation of the vehicle. The operation will be roughly explained with reference to the figure. First, the vehicle starts to move from its original position. At this time, the cleaning operation commences. Thereby, the vehicle measures distances to walls and obstacles at the front and at the side of the robot by means of the ultrasonic sensors (9)–(18) provided on the front and side surfaces, and at the same time, the encoders (6)(7) detect the movement at the vehicle and its direction continuously in the room. The map drawing component (23) recognizes the walls and obstacles in the room using information provided by the sensors and encoders and writes the position into the memory (24) to draw the map. The vehicle stops after reaching a position which is a predetermined constant distance (e.g. 10-15 cm) from the wall or the obstacle, or arriving at an area which has been cleaned previously. The area in which the vehicle has moved in this state is recorded on the map in the memory (24). Thereafter, the next moving direction is decided by the direction decision component (25) and this process will be described later. If movement is impossible, the operation terminates, but if possible, the vehicle changes direction according to a logical decision process and moves onward to repeat the same operation.

Figure 5:
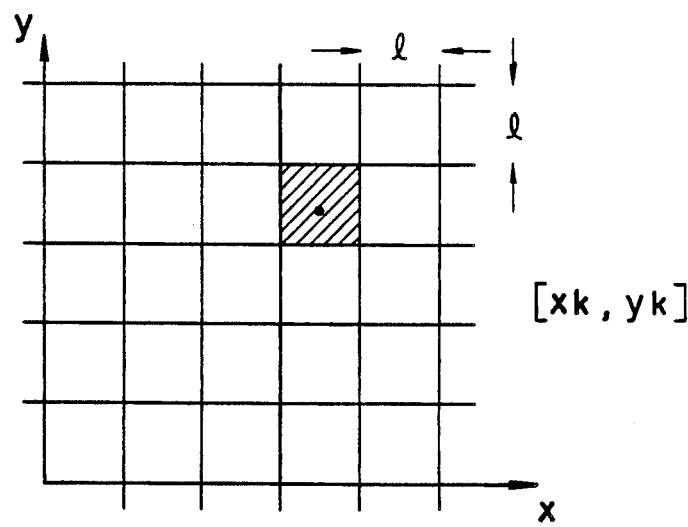
FIG. 5 illustrates the configuration of the memory.

Next, a method for drawing the map will be explained. As shown in FIG. 5, an x - y coordinate system is used to correspond with the room floor area, and is divided into lattices by drawing lines parallel to the x-and y-axes respectively. One lattice is represented by (xk, yk) and corresponds with one to one location in the memory of the memory (24). Here, one lattice is a square of $1 \times 1$ (e.g. 5 cm $\times$ 5 cm).

Figure 6:
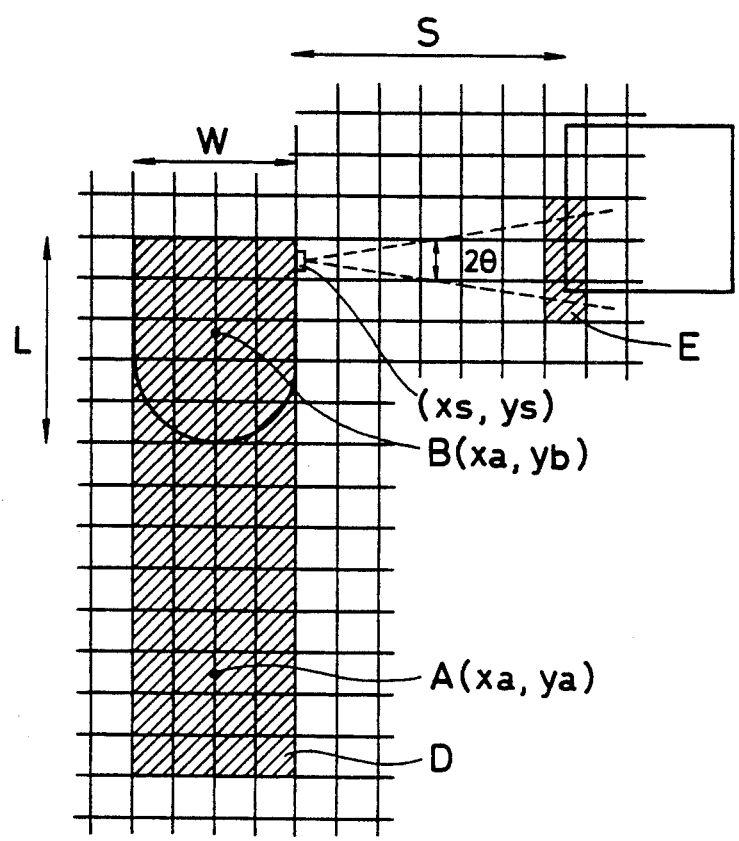
FIG. 6 illustrates the storage conditions in the memory.

When the vehicle moves in the direction of y from a point A (xa, ya) to a point B (xa, yb) as shown in FIG. 6, assuming that the width of the moving vehicle is W and its length is L, and a zeroth bit of one byte of memory (24) corresponds to all lattices included in a square D, (xa−W/2, ya −L/2)−(xa+W/2, yb+L/2), if the value of this expression equals 1, this means the robot has passed the lattice (xk, yk) by determining whether the zeroth bit of one type of memory corresponding to (xk, yk) is given the value 1.

Assuming that, when the position of the vehicle is (xa, yb), the ultrasonic sensor (15) or (16) on the right side has detected a distance S to an object, since the ultrasonic sensor (15) or (16) is capable of determining direction from the characteristics of the sound wave, if the position of the sensor is (xs, ys) when its angle range is 2, the range in which the object is considered to exist is equal to $(xs+S, ys-S \tan \theta) - (xs+S, ys+S \tan \theta)$. Then, the first bit of one byte of the memory (24) corresponding to a lattice point included in this range is given the value of 1. Then, it can be determined whether the lattice point (xk, yk) is an area E in which the obstacle exists by whether or not the first bit of the corresponding memory (24) is equal to the value 1.

Figure 7:
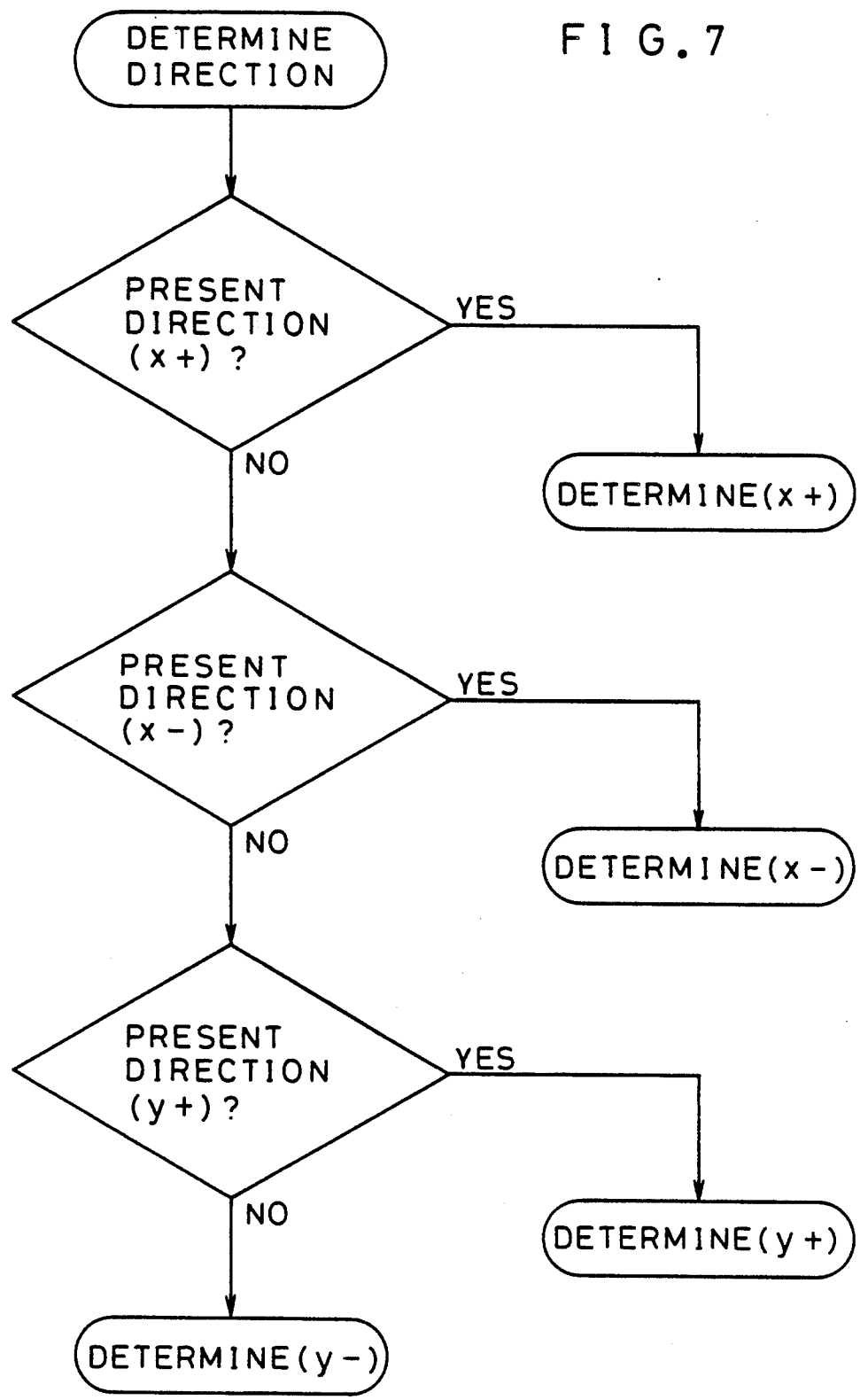
FIGS. 7 through 11 are flow charts showing the logical steps of the decision process used to direct vehicle movement.
Figure 8:
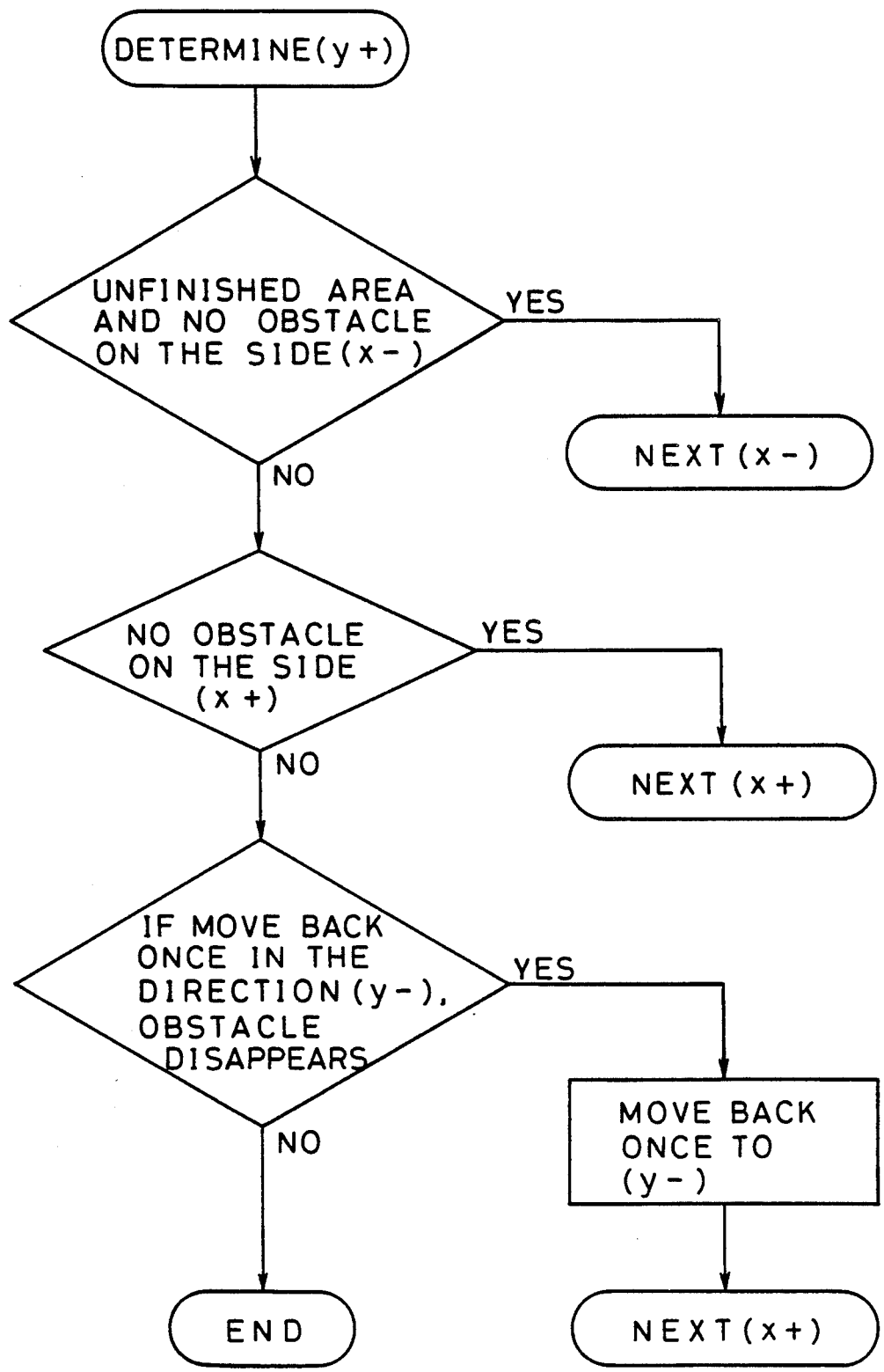

A method for deciding the direction when the moving vehicle stops at a fixed position before a wall or object will now be explained. First, assuming that the vehicle moves only in the positive direction (x+) and negative direction (x−) along the x-axis and in the positive direction (y+) and negative direction (y−) along the y-axis, the present direction of the vehicle is determined from the flow chart in FIG. 7. Thereafter, subsequent movements are decoded for the cases where the vehicle is moving in the directions x+, x−, y+ and y−, respectively, When the vehicle is moving in the direction (y+), if an unfinished area (that is, the map register a "no pass" mark in the area) is detected on the side (x−) and also no obstacle exists in the vicinity of that area (for example, within 50 cm from the robot on the side (x−), or no obstacle appears in that area on the map in the memory (24), the decision will be made to move in the direction (x−). When there is no unfinished area on the side (x−) and also no obstacle exists on the side (x+), the decision will be made to move in the direction (x+). But, if an obstacle exists on the side (x+), the map is then checked to determine whether the obstacle disappears if the vehicle moves backward once in the direction (y−). If this situation occurs, the vehicle moves back to that point and undergoes a similar decision process to decide the next direction(x+). On the other hand, if an obstacle on the side (x+) is still found, the operation is terminated. FIG. 8 shows a flow chart to explain the decision process to determine subsequent direction control instructions.

Figure 9:
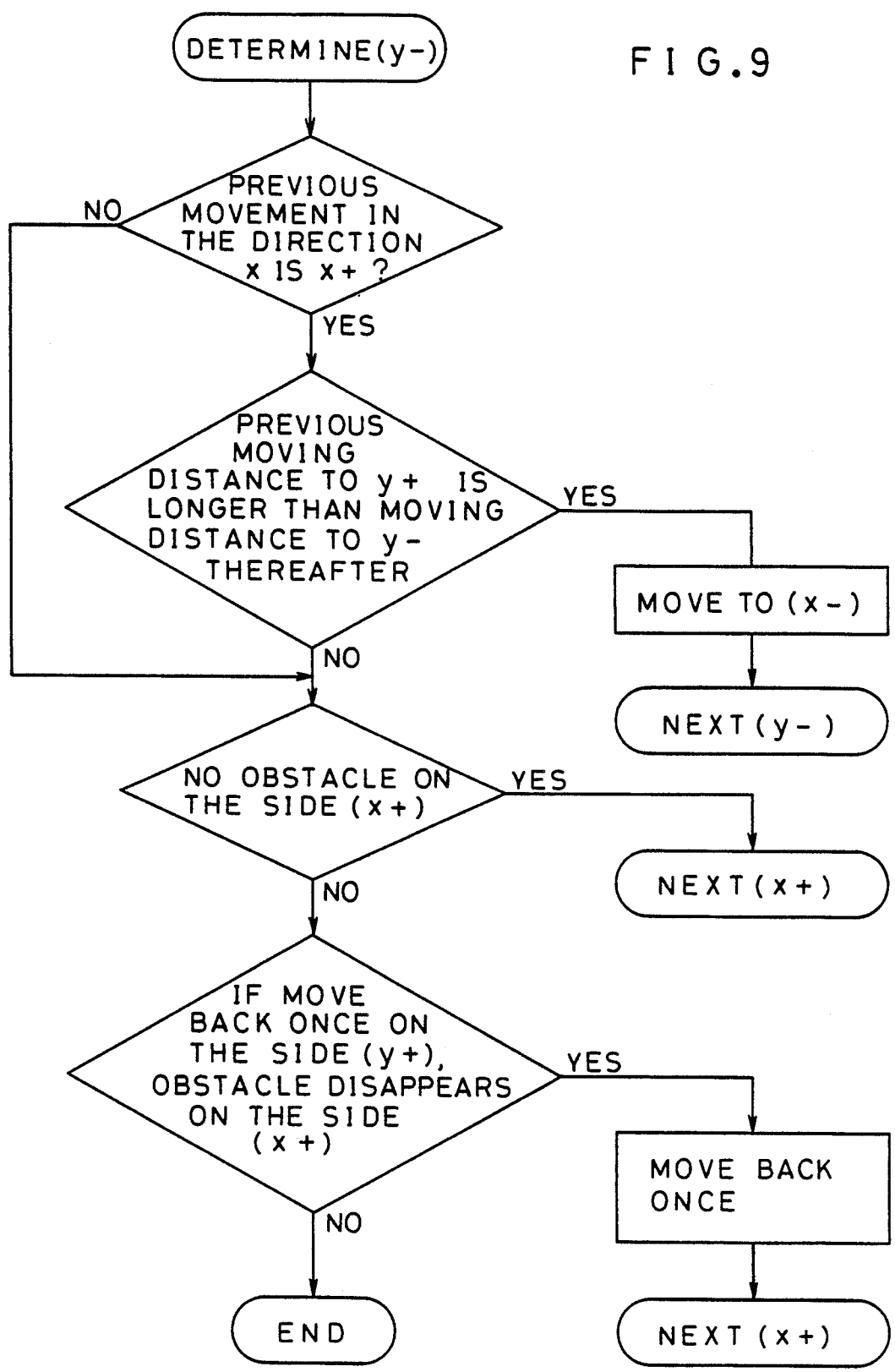

When the vehicle turns to the direction (y−) and is moving in the direction (y−) of this time is shorter than the previous distance in the direction (y+), the vehicle moves once in the direction (x−) then decides the direction (y−). When the distance of movement is in the direction (y−) of this time is longer than or same as the previous distance of movement in the direction (y+), and if there is no object on the side (x+), which is decided as the next direction. On the other hand, if there is an obstacle on the side (x+), the map in the memory (24) is checked to determine whether the obstacle disappears if the vehicle moves backward in the direction (y+). If the obstacle disappears, the vehicle moves back in the direction (y+) to that point and thereafter, makes the decision to continue moving in the direction (x+). Alternately, if an obstacle continues to be detected, operation is terminated. FIG. 9 shows a flow chart of the decision process for determining direction. When the vehicle changes its direction from the direction (y+) or (y−) to the direction (x+) or (x−), it stops at every fixed distance (e.g. 30 cm) along the xaxis to repeat the logical decision process, and continues to move until it meets an obstacle in the direction (x−) or reaching the area which has been previously travelled and cleaned (apparent from the map) and stops.

Figure 10:
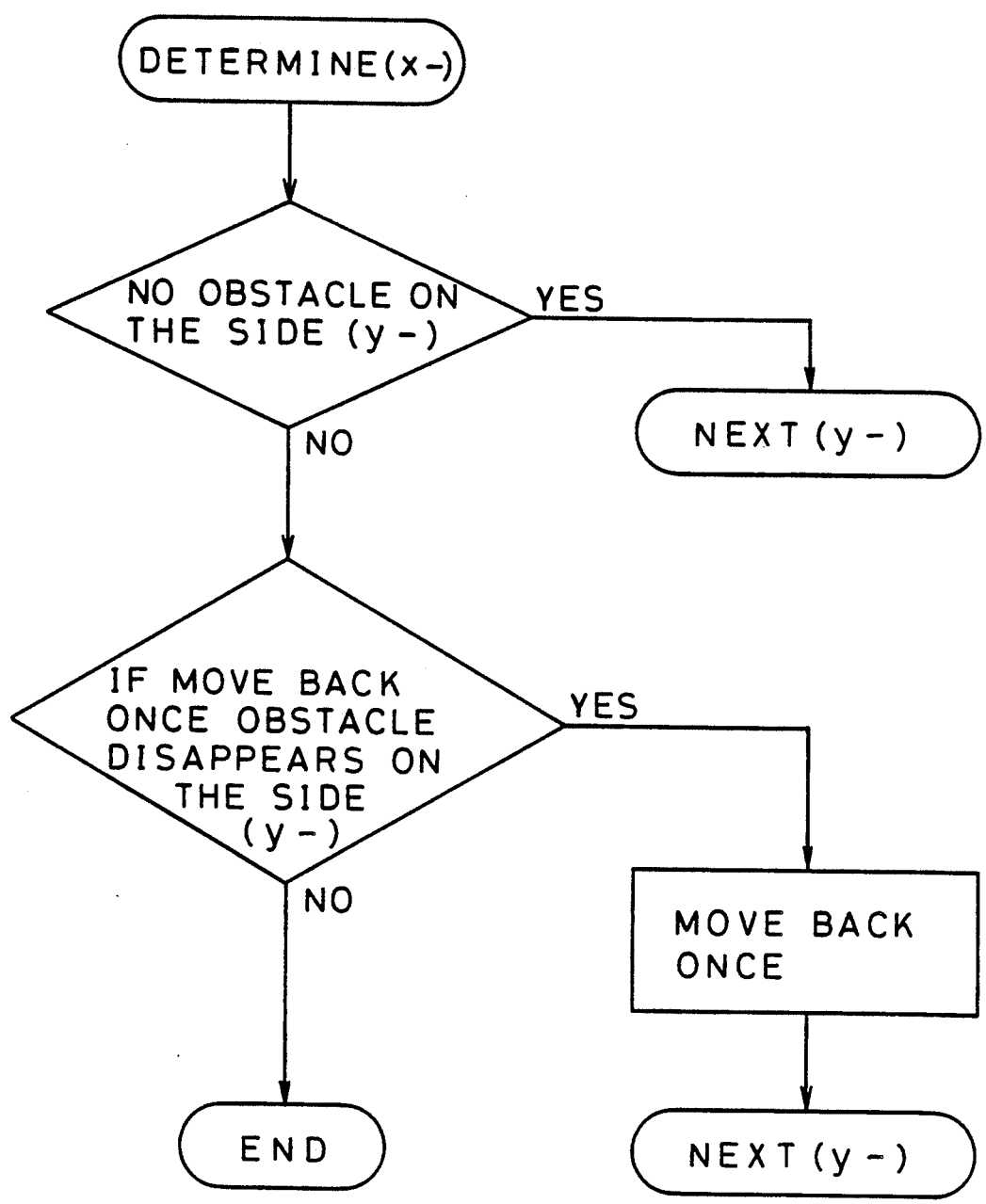

Next, assuming that, when the vehicle is moving in the direction (x−), the (y−) direction of movement is selected next if no obstacle exists on the side (y−). When an obstacle does exist in the direction (y−), the vehicle checks to determine if there is a point at which no object exists on the side (y−) when the vehicle move back once in the direction (x+). If this is the case, the vehicle moves back once to that point and determines the next direction of movement (y−). Alternately, if there is no point where the obstacle disappears on the side (y−) even when moving back in the direction (x+), the operation is terminated. FIG. 10 shows a flow chart illustrating the logical decision process.

Figure 11:
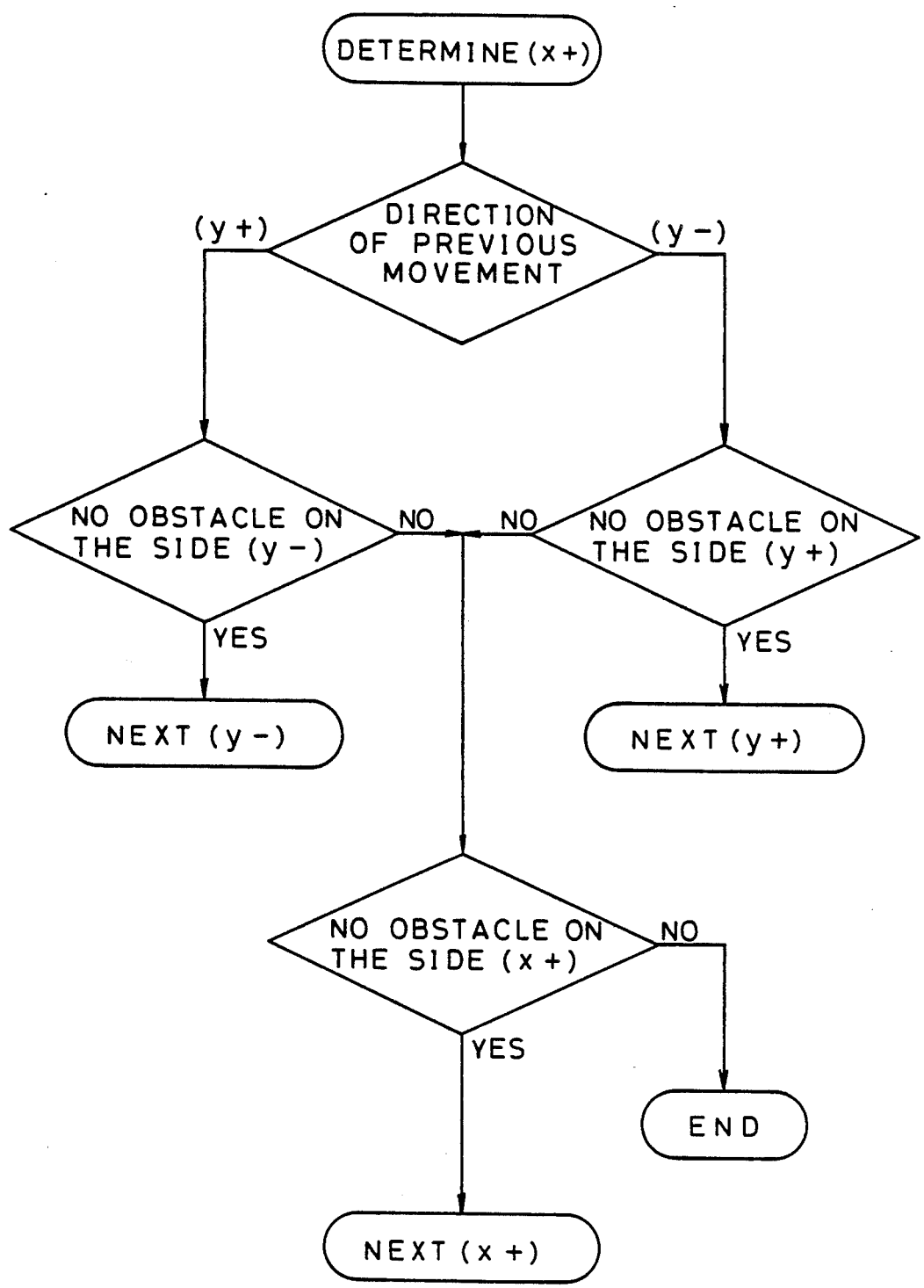

Finally when the vehicle is moving in the direction (x+) and if the previous operation was on the side (y+), the (y−) direction is selected next if there is no obstacle detected on the side (y−). If the vehicle was moving previously moving in the direction (y−) and no obstacle was detected in the direction (y+), the (y+) direction is selected next. If neither the directions (y+) or (y−) are selected the vehicle turns to the direction (x−). If an obstacle does not exist in the direction (x+), the vehicle selects (x+) as the direction. If an obstacle exists in this direction, operation is terminated. FIG. 11 shows a flow chart illustrating the logical decision process.

Figure 12:
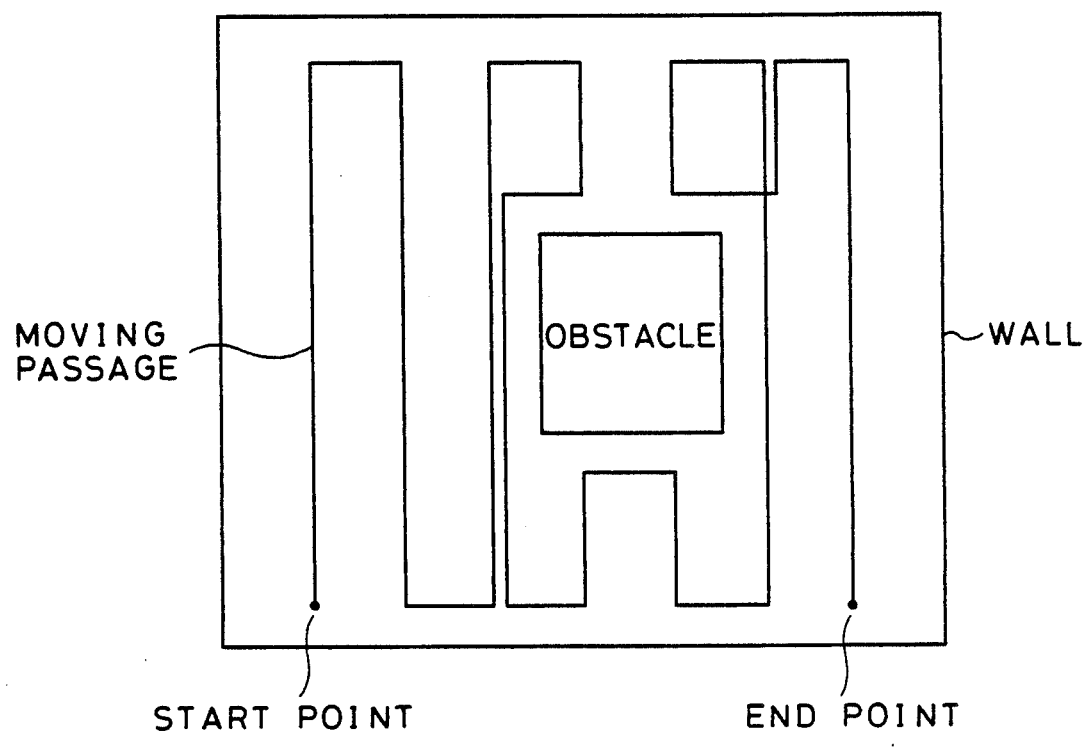
FIG. 12 is a schematic view inside the room showing a passage of the vehicle.

FIG. 12 shows one example of the passage of the vehicle which operates in such a manner, in a square room where an obstacle is placed in the center. In the present embodiment, an ultrasonic sensor is the preferred method for measuring distance, however, it is not limited to this method, and, for example, a range finder using a camera and a laser may also be used.

As a means for detecting the position of the vehicle, besides an encoder, a gyro-sensor, and an earth-magnetism sensor, (a method for recognizing the position by a signal from an oscillating source in the room) may also be used.

Now, a method for correcting the direction of movement when the vehicle is neither parallel nor normal to the x-axis will be explained. First, there are two methods to operate the vehicle so that it approaches a wall. The first method is to use only the ultrasonic sensors without using the collision sensors (20)(19), and the second method is to use both the ultrasonic sensors and the collision sensors (20) (19) in unison.

Figure 13A:
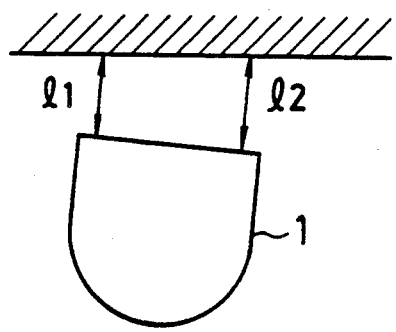
FIGS. 13a and 13b illustrates the method to correct direction in the vehicle.
Figure 13B:
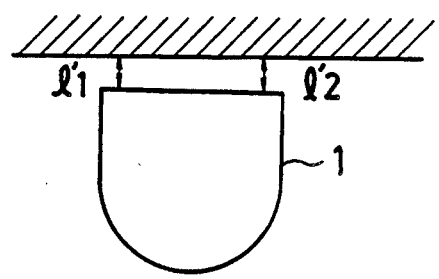

Referring to the first method, when the car body (1) of the vehicle approaches the wall, we assume that it approaches obliquely to the wall as shown in FIG. 13(a). At this time, the main control portion (22) detects $l_1 < l_2$ from measured distance values $l_1$, $l_2$ (in this figure $l_1 < l_2$ by the ultrasonic sensor, and gives the signal to advance the right wheel (2) to the motor driving portion. The left wheel (3) is controlled, at this time, to stop or to advance at a speed slower than that of the right wheel (2). Conversely, if $l_1 > l_2$, the main control portion (22) detects this condition and controls the left wheel (3) to advance more. If $l_1 = l_2$, the main control portion (22) advances both wheels (3) (2) at the same speed. Furthermore, the main control portion (22) stops the vehicle when the measured distance values thus controlled become $l_1, = l_2$, and the distance $l_1$, or $l_2$, reaches a prescribed value (FIG. 13(b)).

Accordingly, the car body (1) approaches and stops against the wall such that its front surface is in parallel to the wall.

Figure 14A:
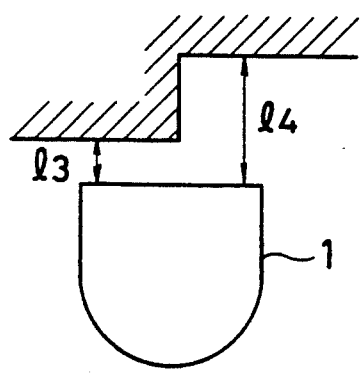
FIGS. 14a and 14b are an explanatory view corresponding to FIG. 13 for explaining another method.
Figure 14B:
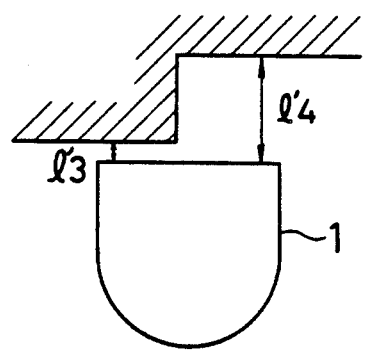
Figure 15:
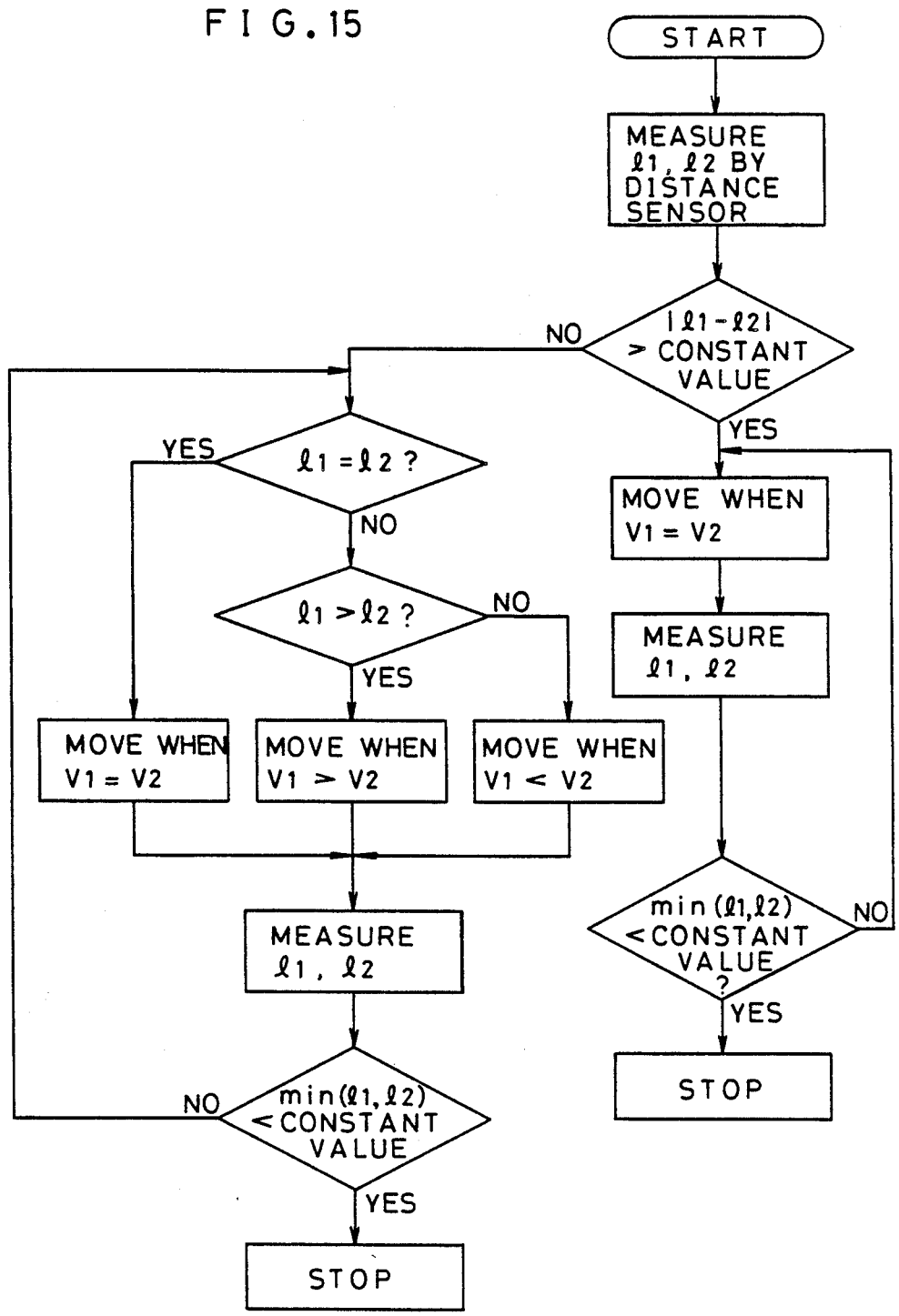
FIGS. 15 and 16a, 16b are flow charts which illustrate methods required to correct direction in a vehicle in case examples illustrated in FIGS. 13a, b and 14a,b.

Though the explanation made hitherto is for the case where the wall exists uniformly in front of the car body, for the case as shown in FIG. 14(a) where there is a step or a right angle corner on the wall and there is more than a fixed difference between measured values $l_3$, $l_4$ the method as aforementioned is not used, but both wheels (3)(2) are advanced at the same speed and controlled to stop when one of the measured values $l_3$, $l_4$, which is closer ($l_3$, in FIG. 14(b) to the wall becomes below a fixed value. FIG. 15 shows a flow chart for the operation of approaching a wall by the first method, where $V_1$ is a rotational speed of the left driving wheel (3) and $V_2$ is that of the right driving wheel (2).

At this time, the collision sensors (20) (19) may be used to detect a collision of the car body (1) with the wall or object which are not detected by the ultrasonic sensor to stop the car body (1) or to change its direction.

Referring now to the second method, the operation of approaching the wall is controlled, as same as the first method, by the measured distance values from the ultrasonic sensor, and the vehicle is brought from the state in FIG. 13 (a) to the state in FIG. 13 (b). Thereafter, the vehicle moves at a slow speed till both collision sensors (20) (19) mounted on the front of the car body (1) detect the wall. When moving at a slow speed, if the left collision sensor signals contact first, the left wheel (3) stops and only the right wheel (2) is advanced till the right collision sensor (19) signals contact. At this time, when the left collision sensor (20) has ceased to signal its contact with the wall, the left wheel (3) is advanced again.

Figure 16A:
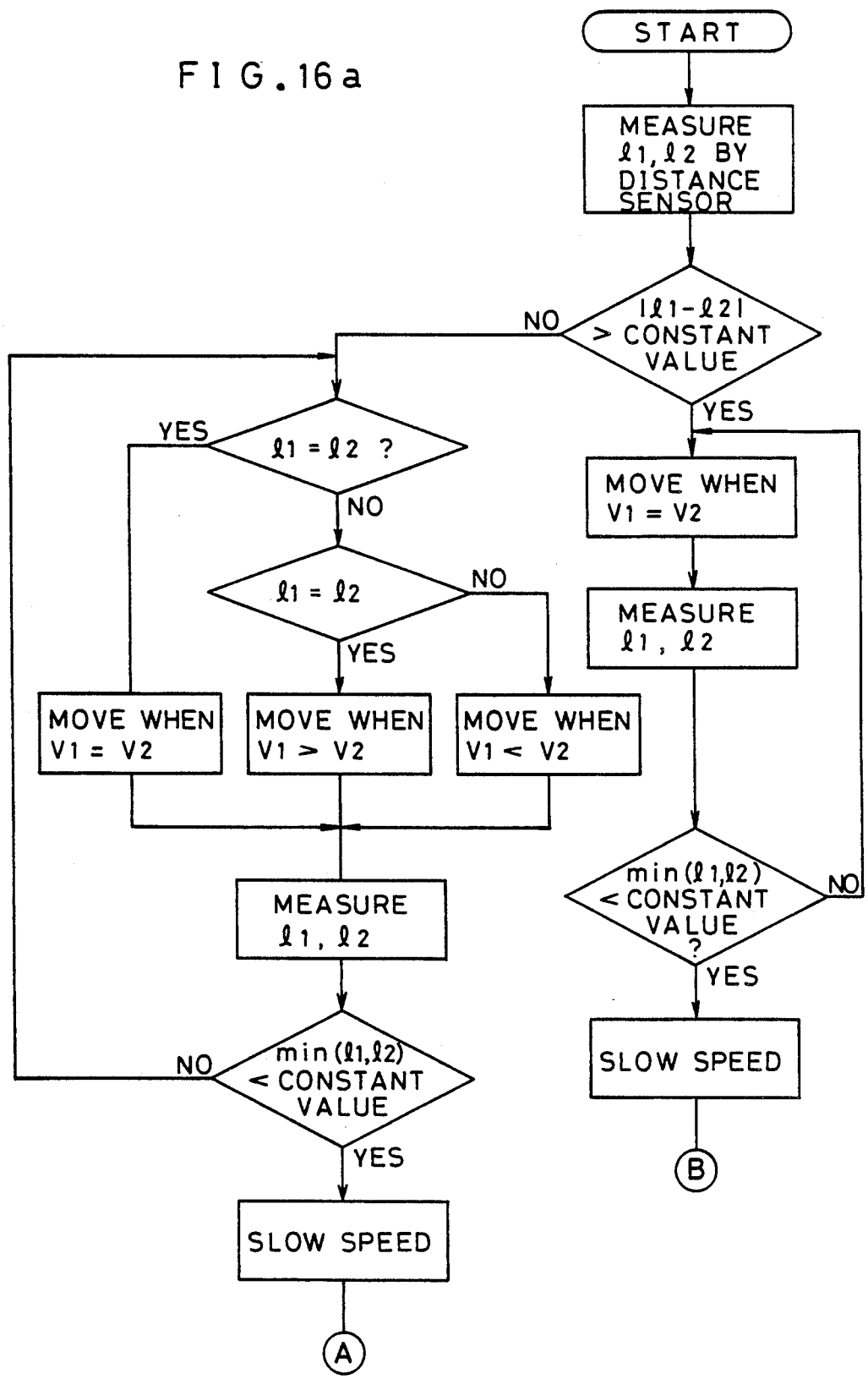
Figure 16B:
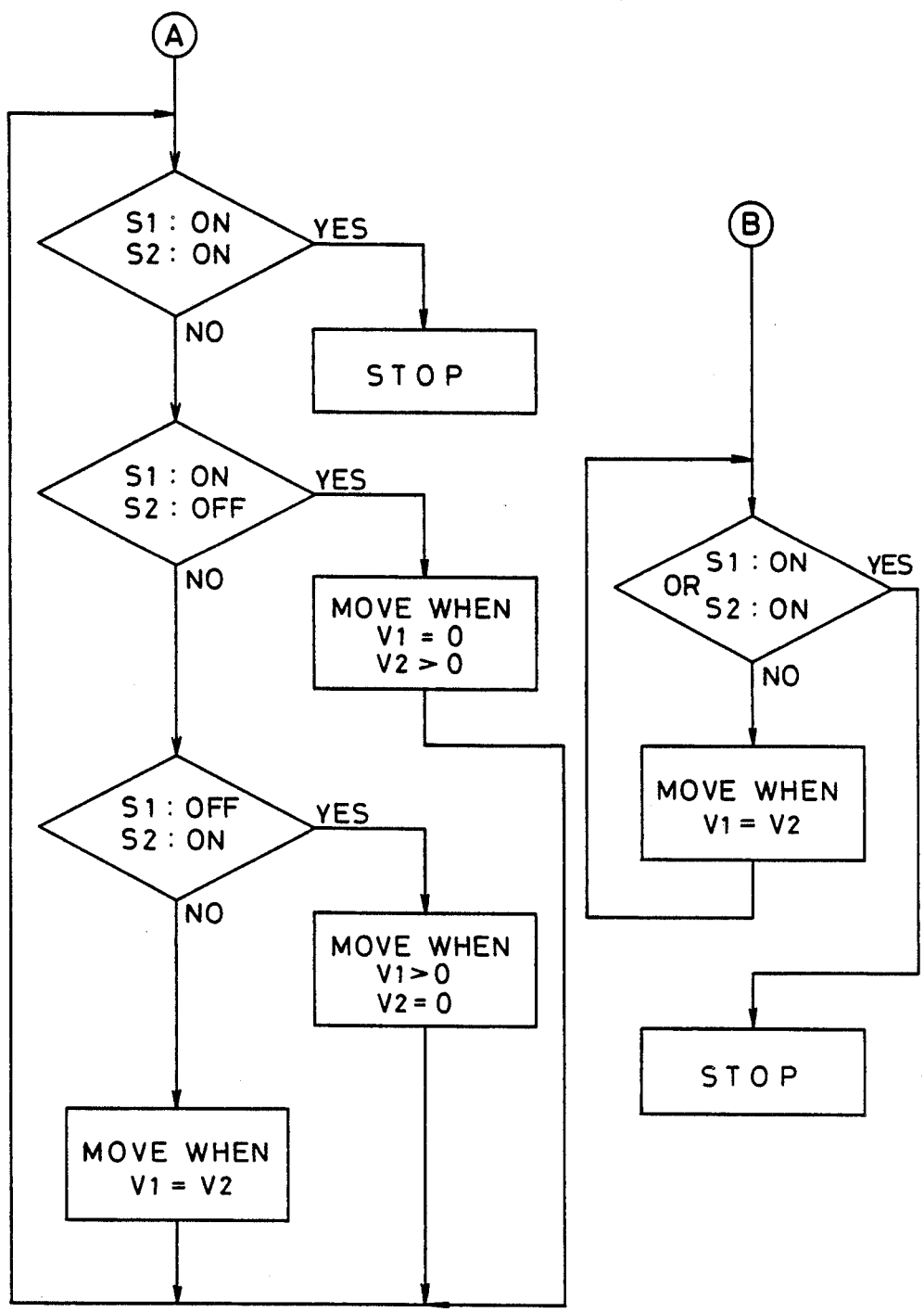

By the aforesaid operation, the car body (1) can be stopped so as to correspond exactly with the wall at its front surface. Next, a shown in FIG. 14, when there is a step or right angle corner on the wall, (FIG. 14(a)), the vehicle moves to the state shown in FIG. 14 (b) till $l_3$, reaches the fixed value similar t the first method. Thereafter, it advances at a slow speed until the front collision sensor (20) signals contact and stops. FIG. 16 shows a flow chart showing the logical decision process for such an operation as approaching a wall by the second method. Here, as same as aforementioned, $V_1$, $V_2$ indicated the speeds of the left driving wheel (3) and the right driving wheel (2), and $S_1$, $S_2$ represent the switching states of the left collision sensor (20) and right collision sensor (19) respectively.

When the vehicle has approached the wall as in the first and second methods, the direction of the car body may be corrected on the basis of its running at a perpendicular angle to the plane of the wall.

While, if there is a step on the wall as shown in FIG. 14, the direction can not be corrected. However, if it can be corrected in the following moving passage, there is no appreciable effect since aberration of the direction is not accumulated from one passage to another.

As mentioned hereinabove, the vehicle (1) comprises: (1) distance measuring means for measuring the distance to the peripheral objects or obstacles, (2) position detecting means for detecting its own position, (3) map drawing means which draws the map inside a room sequentially and continuously based on information delivered by the position detecting means and distance measuring means, and (4) memory means for storing a history of the areas through which it has passed determined by information received from the distance detecting means, and decides the direction of movement corresponding to the map information drawn by the map drawing means. Therefore recognition of the room shape and operation can be performed automatically and provide for an effective and reliable moving operation.

What is claimed is:

1. A vehicle, comprising:
    relative position means for keeping track of a relative position of the vehicle within a predetermined area;
    means for moving the vehicle in a serpentine fashion;
    means for detecting an obstacle which blocks continued movement of the vehicle in the same direction within the predetermined area; and
    instructing means responsive to said relative position means for determining a course of future travel of the vehicle and for instructing said moving means to move the vehicle in said serpentine fashion, said instructing means being responsive to detection of the obstacle which blocks continued movement of the vehicle in the same direction for determining a path to get around the obstacle, said instructing means determining said path to include returning the vehicle to a portion of the predetermined area where the vehicle has already travelled instead of allowing the vehicle to reach a remainder of the predetermined area that has yet to be travelled by the vehicle, said instructing means instructing said moving means to alter course to follow the path and thereby get around the obstacle to reach a remainder of the predetermined area that has yet to be travelled by the vehicle.

2. A vehicle as claimed in claim 1, wherein the serpentine fashion of movement of the vehicle is effected in such a manner that, said moving means moves the vehicle rectilinearly forward to define a rectilinear forward moving passing and then moves the vehicle rectilinearly backward adjacent to and in parallel to the rectilinear forward moving passage so as to define a rectilinear backward moving passage, said moving means thereafter moving the vehicle to repeat rectilinear forward movement adjacent to and in parallel to the rectilinear backward moving passage.

3. A vehicle as claimed in claim 2, wherein the vehicle stops its rectilinear forward and backward movements in response to information received from the distance measuring means, position detecting means, map drawing means and memory means.

4. A vehicle as claimed in claim 3, wherein decision for stopping rectilinear movement is made when the vehicle meets peripheral objects or obstacles or areas which have been previously covered or passed over.

5. A vehicle as claimed in claim 2, wherein said instructing means determines the future course of travel when the vehicle is blocked by the obstacle against continued movement in the same direction by comparing previous distances which the vehicle travelled to define said rectilinear forward and backward moving passages and by determining whether the vehicle may clear the obstacle if moved along said future course of travel.

6. A vehicle as claimed in claim 1 wherein said moving means includes: a body, wheels supporting the body, a motor for driving the wheels and a power cord extending from an AC power source on a wall in a prescribed area for supplying electric power to the motor.

7. A vehicle as claimed in claim 6, wherein said body includes a cord reel for the power cord.

8. A vehicle as claimed in claim 1, wherein the vehicle is used as a cleaning robot.

9. A vehicle as claimed in claim 1, wherein the predetermined area is a room.

10. A vehicle as claimed in claim 1, wherein said instructing means determines the course of future travel of the vehicle based on detection of whether the obstacle is detected to the side of the vehicle and whether after moving once to an adjacent location, the obstacle is free of being to the side of the vehicle at the adjacent location.

11. A vehicle as claimed in claim 1, wherein said relative position means includes distance measuring means for measuring distances to objects or obstacles in the predetermined area; position detecting means for detecting a position of the vehicle within said predetermined area; memory means; and map drawing means for continuously updating and drawing a map of the predetermined area in said memory means based on information received from said distance measuring means and said position detecting means, said instructing means determining said path based on said map and on distances previously travelled by the vehicle.

12. A vehicle as claimed in claim 11, wherein the position detecting means comprises an encoder which detects the moving distance and direction of the vehicle.

13. A vehicle as claimed in claim 11, wherein distance measuring means comprises a plurality of ultrasonic sensors and contact sensors.

* * * * *